United States Patent
Tamaki

(10) Patent No.: US 9,204,033 B2
(45) Date of Patent: Dec. 1, 2015

(54) IMAGE CAPTURE APPARATUS

(75) Inventor: Yoshihito Tamaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/993,355

(22) PCT Filed: Dec. 2, 2011

(86) PCT No.: PCT/JP2011/078496
§ 371 (c)(1),
(2), (4) Date: Jun. 12, 2013

(87) PCT Pub. No.: WO2012/093551
PCT Pub. Date: Jul. 12, 2012

(65) Prior Publication Data
US 2013/0258170 A1    Oct. 3, 2013

(30) Foreign Application Priority Data
Jan. 6, 2011    (JP) .................. 2011-001393

(51) Int. Cl.
*H04N 5/232* (2006.01)
*H04N 5/367* (2011.01)
*H04N 5/369* (2011.01)
*G02B 7/32* (2006.01)
*G02B 7/34* (2006.01)
*G03B 13/36* (2006.01)

(52) U.S. Cl.
CPC .............. *H04N 5/23212* (2013.01); *G02B 7/32* (2013.01); *G02B 7/34* (2013.01); *G03B 13/36* (2013.01); *H04N 5/367* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 2009/0128671 A1* | 5/2009 | Kusaka | 348/246 |
| 2010/0245631 A1* | 9/2010 | Hoda et al. | 348/241 |
| 2011/0013894 A1* | 1/2011 | Takaiwa | 396/48 |
| 2011/0058070 A1* | 3/2011 | Awazu | 348/241 |
| 2011/0228145 A1 | 9/2011 | Kimura | |
| 2012/0057043 A1 | 3/2012 | Yamamoto | |
| 2013/0120643 A1 | 5/2013 | Tamaki | |

FOREIGN PATENT DOCUMENTS

| | | |
|---|---|---|
| JP | 4-267211 A | 9/1992 |
| JP | 5-127074 A | 5/1993 |
| JP | 2007-124056 A | 5/2007 |
| JP | 2009-141390 A | 6/2009 |
| JP | 2009-282018 A | 12/2009 |
| JP | 2010-139665 A | 6/2010 |
| JP | 2010-286826 A | 12/2010 |

* cited by examiner

*Primary Examiner* — Jason Flohre
(74) *Attorney, Agent, or Firm* — Fitzpatrick, Cella, Harper & Scinto

(57) ABSTRACT

An image capture apparatus includes an image capture means having a first pixel group, a second pixel group, and a third pixel group, a focus detection means that calculates a defocus amount of the imaging lens using a first image signal obtained from the first pixel group and a second image signal obtained from the second pixel group, an image generation means that corrects the first and second image signals so as to be equivalent to a third image signal obtained from the third pixel group, and that generates a captured image using first and second corrected image signals and the third image signal, wherein the image generation means corrects the first and second image signals based on the defocus amount calculated by the focus detection means, and obtains the first and second corrected image signals.

18 Claims, 14 Drawing Sheets

F I G. 5A
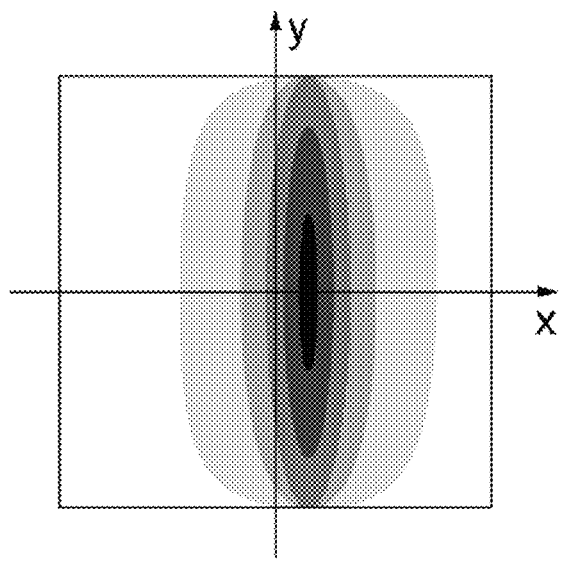
F I G. 5B
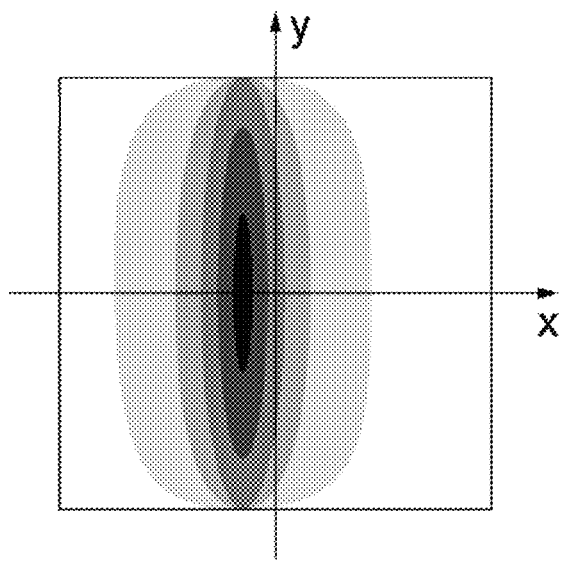
F I G. 5C
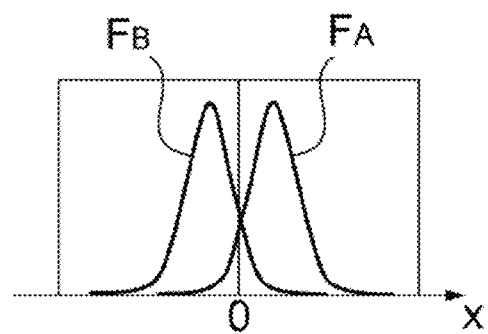

F I G. 6A
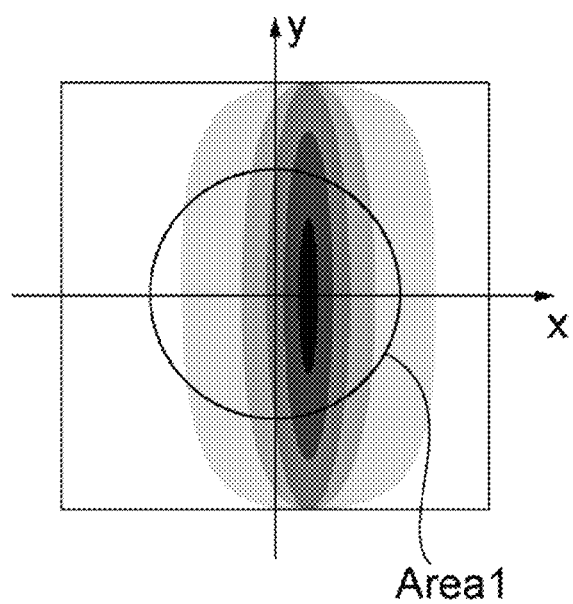
F I G. 6B
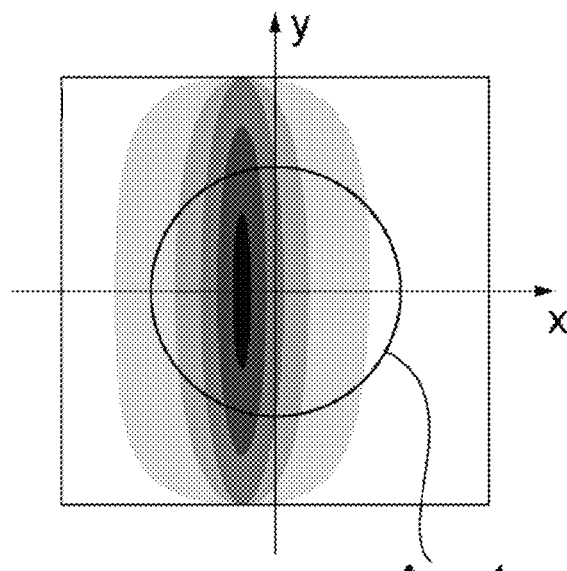
F I G. 6C
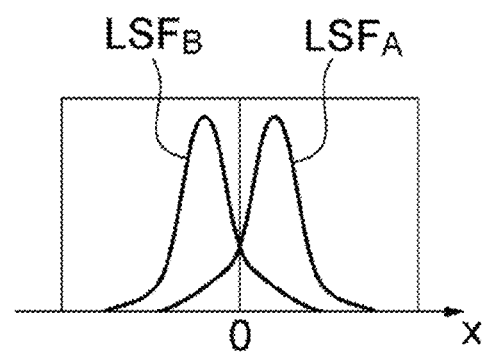

FIG. 9E
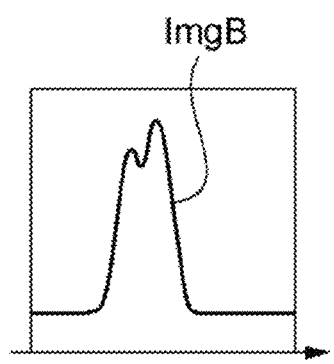
FIG. 9F             FIG. 9G
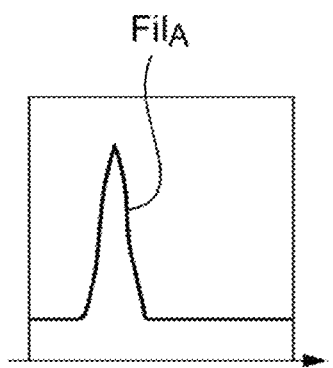   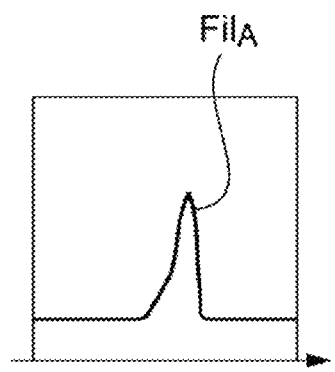
FIG. 9H             FIG. 9I
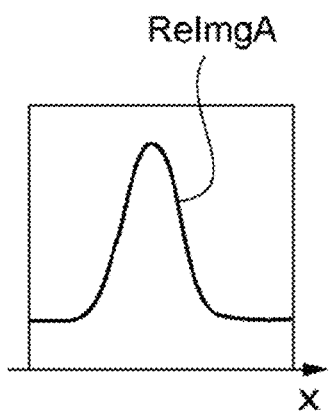   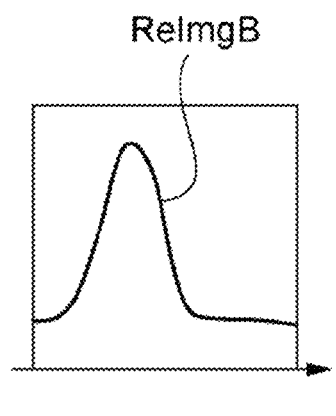

US 9,204,033 B2

IMAGE CAPTURE APPARATUS

TECHNICAL FIELD

The present invention relates to an image capture apparatus having an autofocus function.

BACKGROUND ART

Conventional focus detection methods used for cameras include a contrast detection method that is used for compact cameras, video cameras, and the like, a pupil division method that is used for single-lens reflex cameras, and the like. The contrast detection method is a method in which focus detection is performed by detecting a change in the contrast of an image captured by an image sensor while driving an imaging lens. However, in the focus detection method based on contrast detection, the contrast of an image captured by the image sensor while moving the imaging lens is detected, and the focus state is detected from the amount of change in the detected contrast. Thus, the method has the disadvantage that, for example, in a state that significantly differs from the in-focus state, focus detection takes time. Furthermore, the method has the disadvantage that focus detection cannot be performed with respect to a moving object. Meanwhile, the focus detection method based on pupil division is a method in which the focus state of the imaging lens is detected by correlating two images generated by light beams penetrating different pupil areas of the imaging lens.

In recent years, even the single-lens reflex cameras have come to perform shooting of moving images, and there is a demand for improvements in the AF speed. Thus, with regard to digital cameras in which contrast AF has been conventionally used, Japanese Patent Laid-Open No. 4-267211 discloses a solid-state image capture apparatus that doubles as an image capturing element, in which pixels in which relative positions of a microlens and a photoelectric conversion unit are shifted in order to improve the AF speed are two-dimensionally arranged. When the solid-state image capture apparatus disclosed in Japanese Patent Laid-Open No. 4-267211 shoots an ordinary image, the apparatus adds pixels having different directions of relative shift of the microlens and the photoelectric conversion unit, thereby generating an image. On the other hand, when calculating the focal position of the imaging lens, the solid-state image capture apparatus performs a correlation operation using a pair of image signals generated by pixel columns having different directions of relative shift of the microlens and the photoelectric conversion unit, thereby calculating the focal position of the imaging lens. Moreover, in the case where vignetting due to the imaging lens occurs in light beams that form images during calculation of the focal position, the vignetting due to the imaging lens causes the image signals to be asymmetrical (decreases the coincidence of the images). To address this issue, Japanese Patent Laid-Open No. 5-127074 discloses a technology in which a specific image modification filter housed in an image capture apparatus is deformed in accordance with the aperture ratio, the position of the exit pupil, and the defocus amount, the image modification filter is applied to the image signals, and thereafter the focal position is calculated.

In the case where a still image is acquired using an image capturing element containing focus detection pixels as described above, pixel data corresponding to the position of the focus detection pixels will be missing. If signals obtained from the focus detection pixels are used as image signals for a still image as-is, continuity between the signals from the focus detection pixels and signals from pixels around the focus detection signals will be lost because light receiving angle characteristics of the focus detection pixels differ from the light receiving angle characteristics of ordinary image capturing pixels, and therefore a favorable image cannot be acquired. In order to solve such a problem, Japanese Patent Laid-Open No. 2007-124056 discloses a technology in which image signals corresponding to the signals from the focus detection pixels undergo, depending on the missing level, interpolation that uses image signals from pixels around the focus detection pixels or offset correction or gain correction for the missing pixel data.

However, the above-described conventional technology has the problem in that even though image correction can be performed favorably in an in-focus area, since data of pixels around the pixels to be corrected is used, image correction in a defocus state is performed using the different pixels, and therefore a favorable image cannot be generated.

SUMMARY OF INVENTION

The present invention has been made in view of the above-described problems and enables a favorable image correction process to be realized even when the imaging lens is in a defocus state with respect to predetermined focus detection pixels.

An image capture apparatus according to the present invention includes an image capture means having a first pixel group that receives a light beam passing through a first area in an exit pupil of an imaging lens that forms an object image, a second pixel group that receives a light beam passing through a second area in the exit pupil of the imaging lens, the second area being different from the first area, and a third pixel group that receives a light beam passing through an entire area in the exit pupil of the imaging lens, a focus detection means that calculates a defocus amount of the imaging lens using a first image signal obtained from the first pixel group and a second image signal obtained from the second pixel group, and an image generation means that corrects the first image signal and the second image signal obtained from the first pixel group and the second pixel group of the image capture means so as to be equivalent to a third image signal obtained from the third pixel group, and that generates a captured image using a first corrected image signal, a second corrected image signal, and the third image signal, wherein the image generation means corrects the first image signal and the second image signal based on the defocus amount calculated by the focus detection means using the first image signal and the second image signal, and obtains the first corrected image signal and the second corrected image signal.

Further features of the present invention will become apparent from the following description of exemplary embodiments with reference to the attached drawings.

BRIEF DESCRIPTION OF DRAWINGS

FIGS. 5A to 5C are conceptual diagrams of a received light intensity distribution for focus detection pixels.

FIGS. 6A to 6C are conceptual diagrams of a pupil intensity distribution for focus detection pixels in the middle of an image capturing element.

FIGS. 9A to 9I are conceptual diagrams for explaining a method for correcting asymmetry of image signals.

DESCRIPTION OF EMBODIMENTS

First Embodiment

A first embodiment of the present invention will be described below with reference to FIGS. 1 to 14.

Configuration of Focus Detection Apparatus

Figure 1:
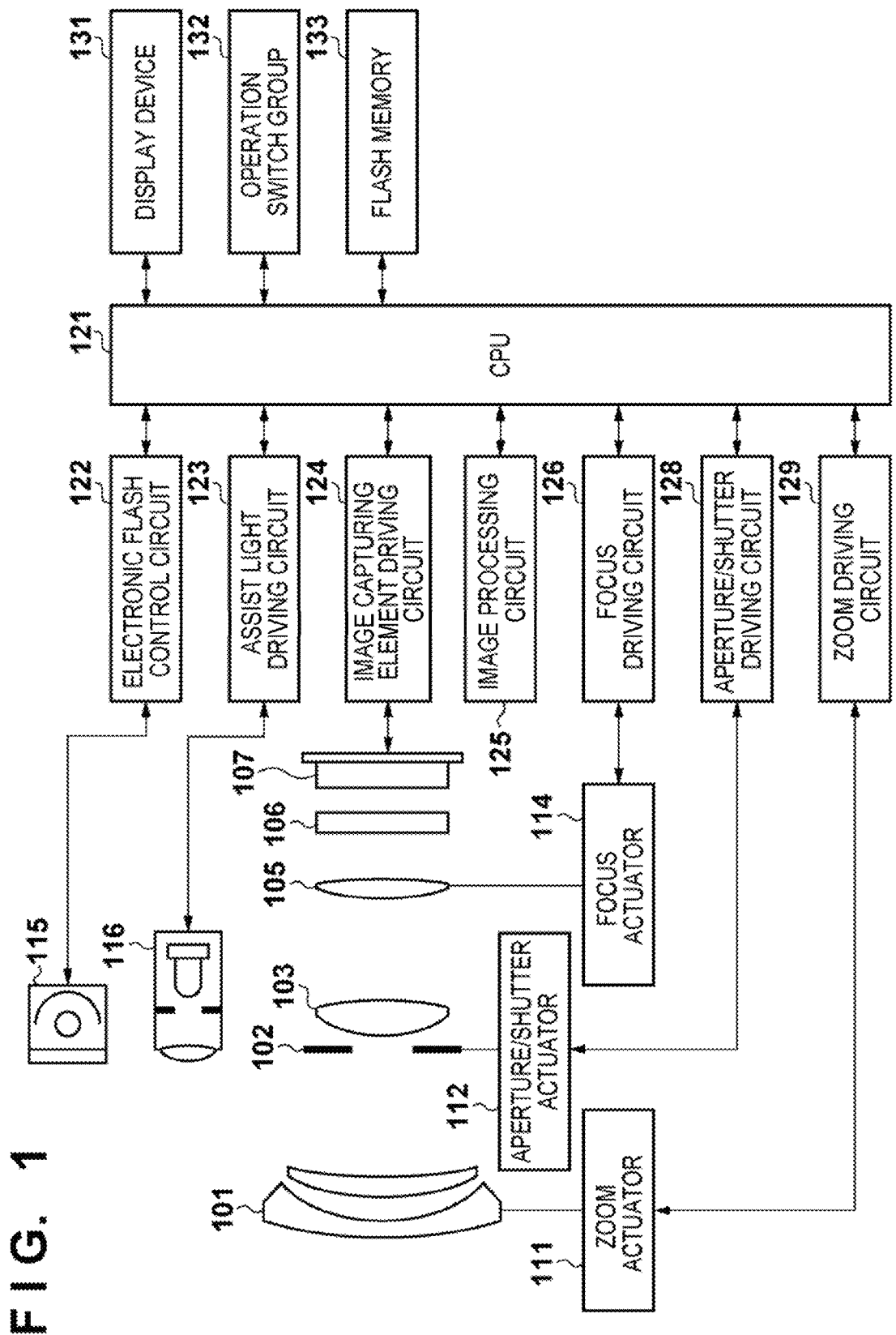
FIG. 1 shows the configuration of an image capture apparatus.

FIG. 1 is a diagram showing the configuration of an image capture apparatus having a focus detection apparatus according to the present embodiment. In FIG. 1, reference numeral 101 indicates a first lens group that is disposed at a tip of an imaging lens (an image forming optical system), and the first lens group is held such that this group can be advanced/retracted in the direction of an optical axis. Reference numeral 102 indicates a shutter that doubles as an aperture, which adjusts light quantity during shooting through adjustment of an opening size thereof and also functions as an exposure time adjustment shutter during shooting of a still image. Reference numeral 103 indicates a second lens group of the imaging lens. The aperture/shutter 102 and the second lens group 103 integrally advance/retract in the direction of the optical axis, thereby performing scaling (zoom function) in conjunction with the advancing/retracting operation of the first lens group 101. Reference numeral 105 indicates a third lens group of the imaging lens, which adjusts the defocus amount by advancing/retracting in the direction of the optical axis. Reference numeral 106 indicates an optical low-pass filter, which is an optical element for reducing a false color or moiré that appears on a captured image. Reference numeral 107 indicates an image capturing element configured of a C-MOS sensor and peripheral circuitry thereof. A two-dimensional single-chip color sensor in which a primary color mosaic filter having a Bayer array is formed on-chip on light receiving pixels that are arranged in m columns and n rows is used as the image capturing element 107. Reference numeral 111 indicates a zoom actuator, which drives the first lens group 101 to the third lens group 105 to advance/retract in the direction of the optical axis by rotating a cam tube (not shown), thereby performing scaling operation. Reference numeral 112 indicates an aperture/shutter actuator, which controls the opening size of the aperture/shutter 102 to adjust the light quantity for shooting and also controls the exposure time during still image shooting. Reference numeral 114 indicates a focus actuator, which drives the third lens group 105 to advance/retract in the direction of the optical axis, thereby adjusting the defocus amount. Reference numeral 115 indicates an electronic flash for illuminating an object during shooting, and although a flash illumination apparatus that uses a xenon tube is preferable, an illumination apparatus provided with an LED that continuously emits light may also be used. Reference numeral 116 indicates an AF assist light unit, which projects an image of a mask having a predetermined opening pattern to an object field via a projector lens, thereby improving the focus detection capability with respect to a dark object or a low-contrast object. Reference numeral 121 indicates a CPU, which conducts various types of control of the main body of the focus detection apparatus. The CPU 121 has an arithmetic unit, a ROM, a RAM, an A/D converter, a D/A converter, a communication interface circuit, and the like, and based on a predetermined program stored in the ROM, drives various types of circuitry included in the focus detection apparatus to execute a series of operations including focus detection, shooting, image processing, and recording. Furthermore, the CPU 121 also serves as an image generation unit according to the present invention.

Reference numeral 122 indicates an electronic flash control circuit, which controls lighting of the electronic flash 115 synchronously with the shooting operation. Reference numeral 123 indicates an assist light driving circuit, which controls lighting of the AF assist light unit 116 synchronously with the focus detection operation. Reference numeral 124 indicates an image capturing element driving circuit, which controls image capturing operation of the image capturing element 107, A/D converts the acquired image signal, and sends the converted signal to the CPU 121. Reference numeral 125 indicates an image processing circuit, which performs processing such as gamma conversion, color interpolation, and JPEG compression on an image acquired by the image capturing element 107. Reference numeral 126 indicates a focus driving circuit, which performs drive control of the focus actuator 114 based on the result of focus detection and adjusts the defocus amount by driving the third lens group 105 to advance/retract in the direction of the optical axis. Reference numeral 128 indicates an aperture/shutter driving circuit, which performs drive control of the aperture/shutter actuator 112, thereby controlling the opening of the aperture/shutter 102. Reference numeral 129 indicates a zoom driving circuit, which drives the zoom actuator 111 in accordance with zoom operation by a photographer. Reference numeral 131 indicates a display device such as an LCD, which displays information regarding the shooting mode of the focus detection apparatus, a preview image before shooting and a confirmation image after shooting, an image indicating the in-focus state during focus detection, and the like. Reference numeral 132 indicates a group of operation switches, which includes a power switch, a release (shooting trigger) switch, a zoom operation switch, a shooting mode selection switch, and the like. Reference numeral 133 indicates a removable flash memory, which records an image that has been captured.

Structure of Image Capturing Pixels

Figures 2A, 2B:
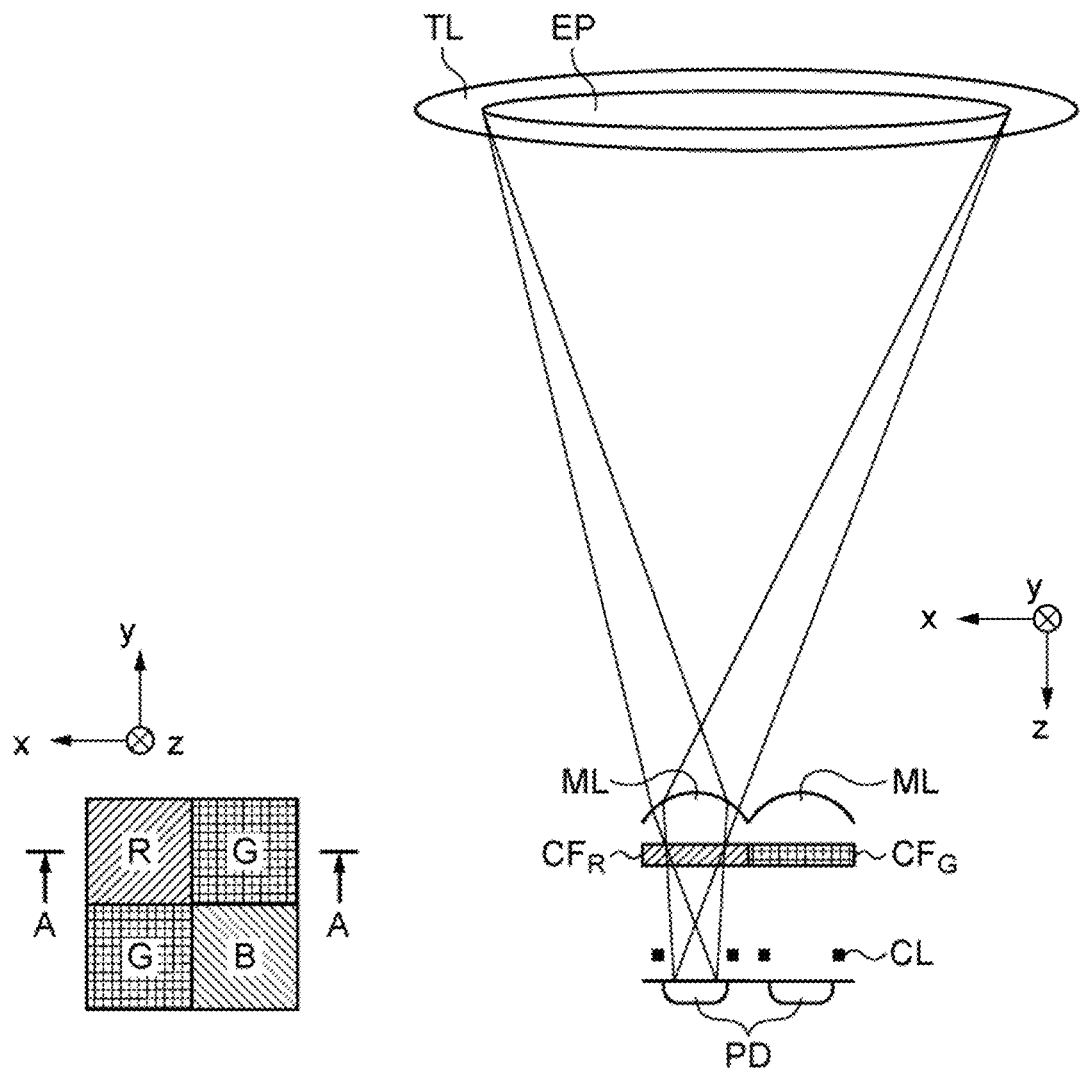
FIGS. 2A and 2B show the structure of image capturing pixels.

FIGS. 2A and 2B are diagrams for explaining the structure of image capturing pixels. The image capturing pixels may be referred to as a third pixel group in the present embodiment. FIGS. 2A and 2B show a plan view and a cross-sectional view, respectively, in which a portion of the image capturing pixels is enlarged. In the present embodiment, image capturing pixels (G pixels) having a spectral sensitivity to G (green) are disposed as two diagonally opposed pixels of four adjacent pixels arranged in two rows and two columns. Two image capturing pixels (an R pixel and a B pixel) having a spectral sensitivity to R (red) and B (blue), respectively, are disposed as the other two pixels. That is to say, in the present embodiment, an example in which a Bayer array is adopted is described. Moreover, focus detection pixels having a structure that will be described later are dispersedly allocated in the Bayer array in conformity with a predetermined rule. FIG. 2A is a plan view of the image capturing pixels that are located in the middle of the image capturing element and arranged in two rows and two columns. In the Bayer array, the G pixels are disposed in a diagonal direction, and the R and B pixels are disposed as the other two pixels. Then, this arrangement of two rows and two columns is repeated. FIG. 2B shows a cross-section taken along line A-A in FIG. 2A. ML indicates an on-chip microlens that is disposed at the front of each image capturing pixel, CFR indicates an R (red) color filter, and CFG indicates a G (green) color filter. PD indicates a schematic representation of a photoelectric conversion unit of the C-MOS sensor, and CL indicates a wiring layer for forming a signal line that transmits various types of signals in the C-MOS sensor. TL indicates a schematic representation of the imaging lens. Here, the on-chip microlens ML and the photoelectric conversion unit PD of each image capturing pixel are configured so as to capture light beams passing through the imaging lens TL as effectively as possible. In other words, an exit pupil EP (also referred to as a pupil area) of the imaging lens TL and the photoelectric conversion unit PD are made to be conjugate to each other by the microlens ML, and the photoelectric conversion unit is designed so as to have a large effective area. Moreover, although FIG. 2B illustrates light beams incident on the R pixel, the G pixels and the B pixel also have the same structure. Therefore, areas of the R, G, and B image capturing pixels where light can be received have a large diameter, and effectively capture light beams from the object, thereby improving the S/N of an image signal (a third image signal).

Structure of Focus Detection Pixels

Figures 3A, 3B:
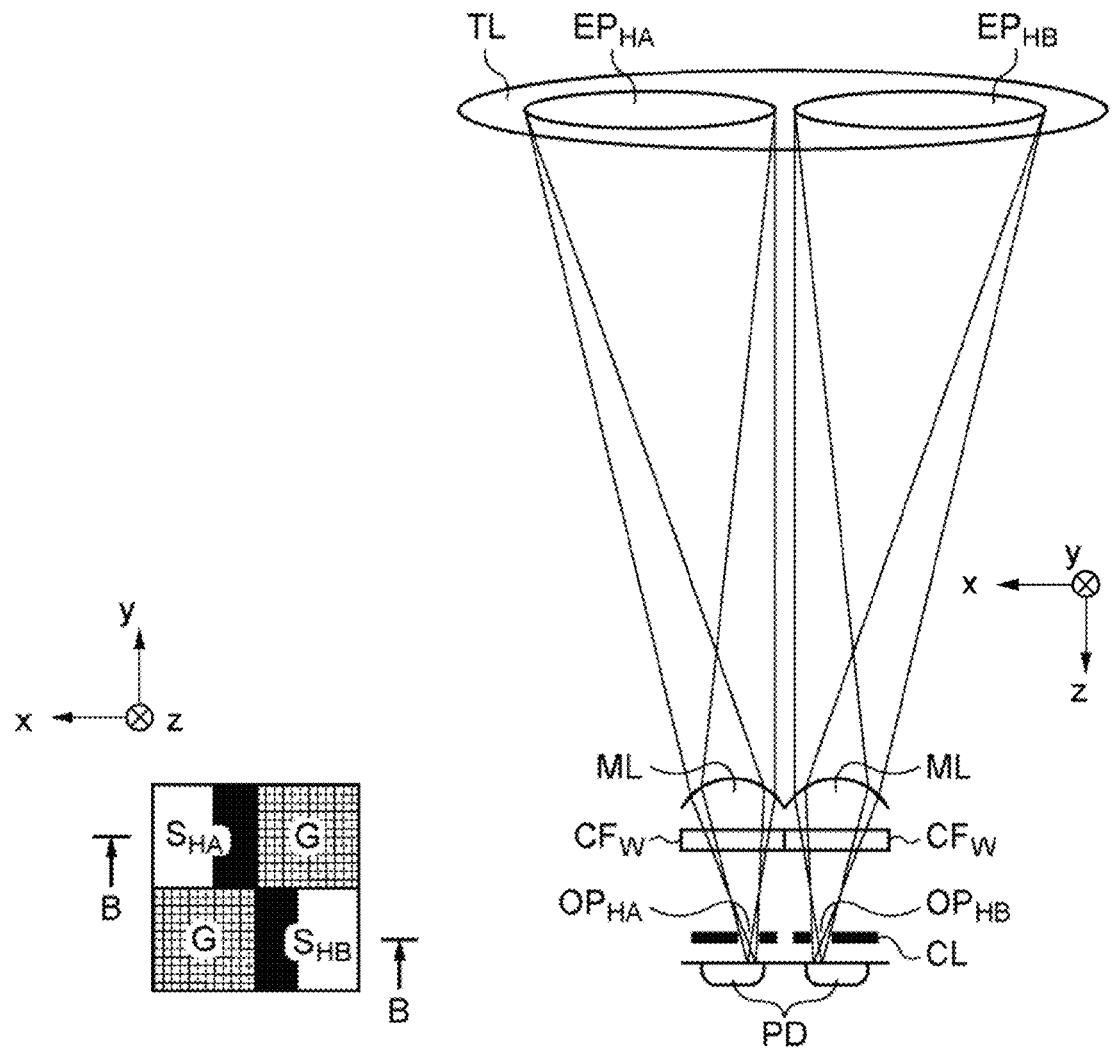
FIGS. 3A and 3B show the structure of focus detection pixels.

FIGS. 3A and 3B are diagrams explaining the structure of focus detection pixels. In the present embodiment, the focus detection pixels may be referred to as a first pixel group and a second pixel group. FIGS. 3A and 3B show a plan view and a cross-sectional view, respectively, in which a portion of focus detection pixels for performing pupil division in an x direction of the imaging lens TL in FIG. 3B is enlarged. FIG. 3A is a plan view of pixels that are located in the middle of the image capturing element and arranged in two rows and two columns containing focus detection pixels. In the case where an image signal is to be obtained, since among human image recognition characteristics, humans are sensitive to luminance information, if a G pixel is missing, deterioration in the image quality is likely to be perceived. Thus, the G pixels provide a main component of luminance information. On the other hand, R pixels or B pixels are image capturing pixels for acquiring color information, and since humans are insensitive to color information, even when a few R pixels or B pixels, which acquire color information, are missing, deterioration in the image quality is unlikely to be noticed. Thus, in the present embodiment, among adjacent image capturing pixels arranged in two rows and two columns, the G pixels are left as the image capturing pixels, and focus detection pixels are disposed at a certain rate in the positions corresponding to the R pixel and the B pixel. In FIG. 3A, these pixels are indicated by SHA and SHB. FIG. 3B shows a cross-section taken along line B-B in FIG. 3A. The microlenses ML and the photoelectric conversion units PD have the same configuration as those of the image capturing pixels shown in FIG. 2B. Moreover, since pupil division is performed by the image capturing element, openings in the wiring layer CL are shifted in the x direction relative to center lines of the microlenses ML. Specifically, an opening OPHA of the focus detection pixel SHA is shifted in a −x direction and therefore receives light beams passing through an exit pupil EPHA (a first area) in the left side of the imaging lens TL on the plane of paper of FIG. 3B. Similarly, an opening OPHB of the pixel SHB is shifted in a +x direction and therefore receives light beams passing through an exit pupil EPHB (a second area) in the right side of the imaging lens TL on the plane of paper of FIG. 3B. Here, focus detection pixels SHA are regularly arranged in the x direction, and a first image signal acquired by the group of these focus detection pixels SHA is expressed as an image signal A (a first image signal). Moreover, focus detection pixels SHB are also regularly arranged in the x direction, and a second image signal acquired by the group of these focus detection pixels SHB is expressed as an image signal B (a second image signal). Then, it is possible to calculate a defocus amount of the imaging lens from a relative image shift amount between the image signal A and the image signal B. Based on the calculation result, the defocus amount of the imaging lens is adjusted.

Concept of Pupil Division by Image Capturing Element

Figure 4:
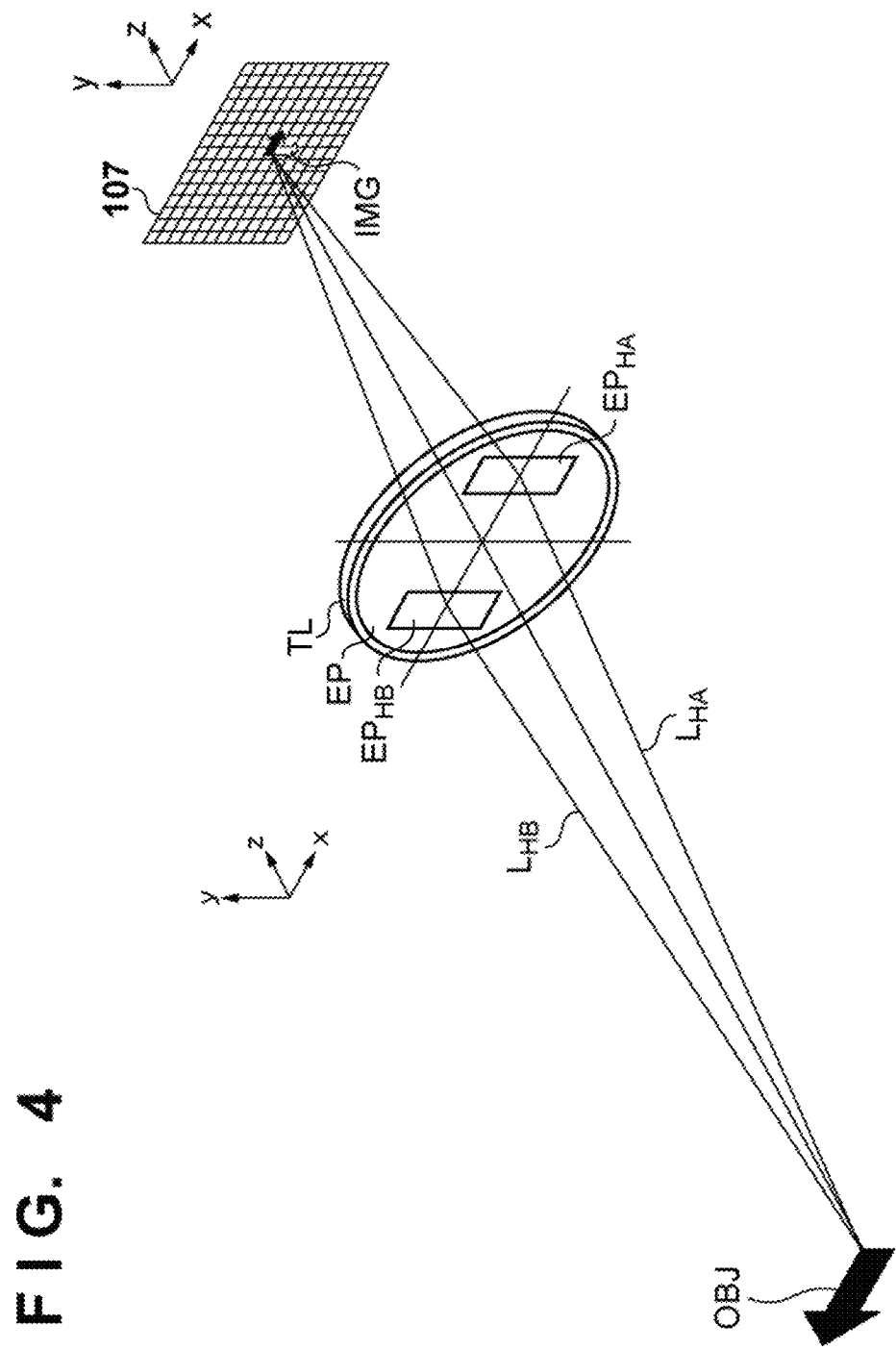
FIG. 4 is a conceptual diagram of pupil division.

FIG. 4 is a diagram for conceptually explaining pupil division of the imaging lens by the image capturing element of the present embodiment. TL indicates the imaging lens, reference numeral 107 indicates the image capturing element, OBJ indicates the object, and IMG indicates an object image. The image capturing pixels receive light beams passing through the entire exit pupil EP of the imaging lens, as described using the plan view and the cross-sectional view of the image capturing pixels of the image capturing element in FIGS. 2A and 2B. On the other hand, the focus detection pixels have a pupil division function, as described using the plan view and the cross-sectional view of the focus detection pixels for performing pupil division in the x direction in FIG. 3A. Specifically, the pixel SHA in FIG. 3A receives light beams passing through the +x direction side of the pupil, or in other words, light beams passing through the pupil area EPHA in FIG. 4. Moreover, the pixel SHB in FIG. 3A receives light beams passing through the −x direction side of the pupil, or in other words, light beams passing through the pupil area EPHB in FIG. 4. The focus detection pixels are distributed over the entire image capturing element 107, thereby allowing for focus detection over the entire image capturing area. It should be noted that although a configuration suited to the object having a luminance distribution in the x direction because the light receiving angle characteristics of the focus detection pixels have asymmetry in the x direction has been described, a configuration also suited to an object having a luminance distribution in a y direction can be achieved by extending the same configuration in the y direction as well.

Received Light Intensity Distribution of Sensor

An intensity distribution of light that can be received by a pixel constituting the image capturing element is referred to as a received light intensity distribution. FIGS. 5A to 5C are diagrams representing received light intensity distributions of the focus detection pixels and projections obtained from the received light intensity distributions. FIG. 5A shows the characteristics of the focus detection pixel SHA, and FIG. 5B shows the characteristics of the focus detection pixel SHB. The x axis and the y axis in FIGS. 5A to 5C correspond to the x axis and the y axis in FIG. 4. In FIGS. 5A to 5C, darker colors indicate higher received light intensities. In FIG. 3B, in order to facilitate description, the exit pupil for the focus detection pixel SHA and the exit pupil for the focus detection pixel SHB were separately expressed as EPHA and EPHB, respectively. However, as shown in FIGS. 5A to 5C, actually, light beams are blurred and spread out as a result of diffraction caused by openings of the opening OPHA and the opening OPHB shown in FIG. 3B, and the light receiving area of the focus detection pixel SHA and the light receiving area of the focus detection pixel SHB partially overlap. FIG. 5C shows projections of the received light intensity distributions in FIGS. 5A and 5B in the y direction. In FIG. 5C, the projection of FIG. 5A is indicated by FA, and the projection of FIG. 5B is indicated by FB. The horizontal axis corresponds to the x axis in FIGS. 5A and 5B, and the vertical axis represents line spread function intensity. The origin O corresponds to the position of the optical axis of the imaging lens. FA and FB are thus each approximately symmetrical in the x-axis direction with respect to the position of the centroid in the x-axis direction.

Pupil Intensity Distribution and Line Spread Function when Vignetting Occurs

Next, the state in which the imaging lens is attached will be considered. An intensity distribution of light that can be received by a pixel constituting the image capturing element on an assumed pupil plane will be referred to as a pupil intensity distribution. FIGS. 6A to 6C are diagrams showing received light intensity distributions in the case where vignetting due to the imaging lens occurs, that is, pupil intensity distributions and line spread functions obtained from those pupil intensity distributions, in contrast to the received light intensity distributions in FIGS. 5A to 5C. FIG. 6A shows the characteristics of the pupil intensity distribution of the focus detection pixel SHA and FIG. 6B shows the characteristics of the pupil intensity distribution of the focus detection pixel SHB in the case where vignetting due to the imaging lens occurs. Within the pupil intensity distributions of the focus detection pixels SHA and SHB shown in FIGS. 5A to 5C, only the inside of the shapes indicated by Area1 is the area that the focus detection pixel SHA or SHB receives light. FIG. 6C is a diagram showing line spread functions in the case where vignetting due to the imaging lens occurs. FIG. 6C shows projections of the pupil intensity distributions in FIGS. 6A and 6B in the y direction as is the case with FIG. 5C. The horizontal axis corresponds to the x axis in FIGS. 5A and 5B, and the vertical axis represents line spread function intensity. The origin O corresponds to the position of the optical axis of the imaging lens. Here, it is conceivable that an intensity distribution of a point image formed on an image forming plane by a given point light source passing through an exit pupil of an optical system, that is, a so-called point spread function is a reduced size projection of the shape of the exit pupil onto the image forming plane if the optical system is aplanatic. Since a line spread function is a projection of point spread functions, a projection of a pupil intensity distribution is regarded as a line spread function. As shown in FIG. 6C, with respect to the focus detection pixels in the middle of the image capturing element, the line spread functions LSFA and LSFB are approximately symmetrical with respect to the optical axis (the shapes of the images approximately coincide). Moreover, the line spread functions LSFA and LSFB are each asymmetrical in the x-axis direction with respect to the position of the centroid thereof in the x-axis direction.

Configuration for Focus Detection of Image Capturing Element 107 and Image Capturing Element Driving Circuit 124

Figure 7:
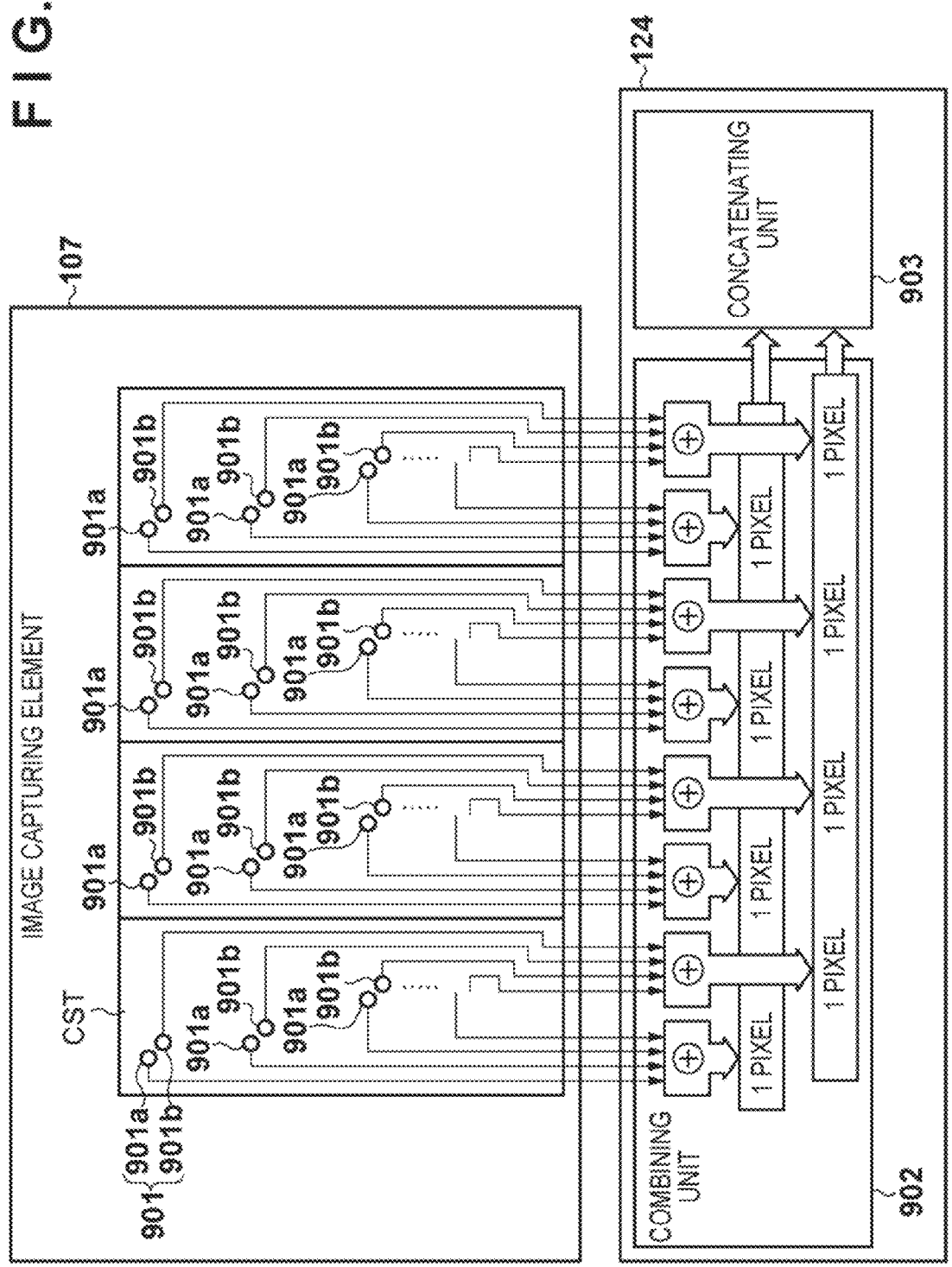
FIG. 7 is a circuit diagram of an image capturing element driving circuit.

FIG. 7 is a diagram schematically showing a focus detection configuration of the image capturing element 107 and the image capturing element driving circuit 124 in FIG. 1. It should be noted that the A/D conversion unit is omitted in FIG. 7 for the sake of clarity of description. The image capturing element 107 has a plurality of focus detection pixels 901 constituted by focus detection pixels 901a and focus detection pixels 901b, which have been described using FIGS. 3A and 3B. Each focus detection pixel 901a corresponds to the focus detection pixel SHA, and each focus detection pixel 901b corresponds to the focus detection pixel SHB. Moreover, the image capturing element 107 includes a plurality of image capturing pixels for photoelectrically converting an object image formed by the imaging lens. The image capturing element driving circuit 124 includes a combining unit 902 and a concatenating unit 903. The image capturing element driving circuit 124 assigns a plurality of sections (areas) CST to an image capturing plane of the image capturing element 107 so that a plurality of focus detection pixels 901 are contained in each section. In addition, the image capturing element driving circuit 124 can change the size, the arrangement, the number, and the like of the sections CST. The combining unit 902 performs processing for obtaining a first composite signal of one pixel by combining signals output from the focus detection pixels 901a in each of the plurality of sections CST assigned on the image capturing element 107. The combining unit 902 also performs processing for obtaining a second composite signal of one pixel by combining signals output from the focus detection pixels 901b in each section CST. The concatenating unit 903 performs processing for obtaining a first concatenated signal by concatenating focus detection pixels, which are the first composite signals, and processing for obtaining a second concatenated signal by concatenating the second composite signals with respect to the plurality of sections CST. In this manner, concatenated signals in which as many focus detection pixels as the number of sections are concatenated are obtained for the focus detection pixels 901a and for the focus detection pixels 901b, respectively. The CPU 121 computes the defocus amount of the imaging lens based on the first concatenated signal and the second concatenated signal. Since signals output from the focus detection pixels of the same pupil division direction that are arranged in the sections are combined in this manner, even in the case where the luminance of the individual focus detection pixels 901 is low, it is possible to sufficiently detect the luminance distribution of the object.

Image Signal Output from Image Capturing Element 107

Figure 8:
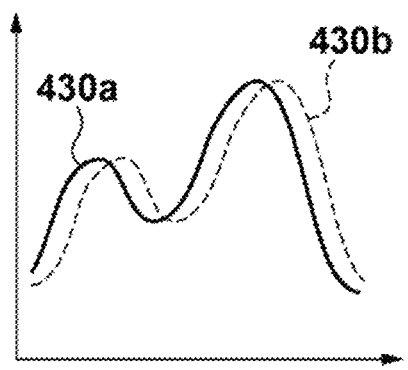
FIG. 8 is a diagram showing image signals that are obtained from the element in FIG. 7.

FIG. 8 shows a pair of image signals that is formed by the focus detection pixels 901, the combining unit 902, and the concatenating unit 903 in FIG. 7 and that is sent to the CPU 121. In FIG. 8, the horizontal axis represents a direction in which pixels of the concatenated signals are aligned, and the vertical axis represents signal intensity. An image signal 430a is formed by the focus detection pixels 901a, and an image signal 430b is formed by the focus detection pixels 901b. The focal position of the imaging lens is in a defocus state, and therefore the image signal 430a is shifted to the left, and the image signal 430b is shifted to the right. This image shift amount between the image signals 430a and 430b is calculated by a correlation operation, and thus it is possible to find the defocus amount of the imaging lens. Here, according to focus detection of the present embodiment, since vignetting due to the imaging lens causes the line spread functions to be asymmetrical with respect to the centroid as described using FIGS. 6A to 6C, the image signal A and the image signal B obtained from the focus detection pixels also become asymmetrical. In other words, the coincidence of the images decreases. In focus detection using a phase difference detection method, when the coincidence of images is low (asymmetry), it is not possible to accurately calculate the defocus amount. In the present embodiment, this problem is solved by correcting the asymmetry between the obtained image signals during focus detection.

Asymmetry Between Image Signals

Hereinafter, the reason that image signals become asymmetrical and correction for the asymmetry will be described in detail.

Now, when the light quantity distribution of the object is expressed as f(x, y), and the light quantity distribution of an image signal is expressed as g(x, y), a relationship (convolution)

$$g(x, y) = \int_{-\infty}^{\infty}\int_{-\infty}^{\infty} f(x-a, y-b)h(a, b)dadb \quad (1)$$

holds. Here, h(a, b) is a transfer function expressing a state in which the object deteriorates in an image forming system, and is called a point spread function. Therefore, in order to find a pair of image signals for use in focus detection, it is necessary to find a point spread function. Here, in focus detection that uses an image shift detection method, attention is paid to a one-dimensional direction of the pair of image signals to calculate the defocus amount. For this reason, it is possible to evaluate an image system related to focus detection using a line spread function, which is a one-dimensional function, instead of the two-dimensional point spread function. Therefore, when the light quantity distribution of the object is substituted with f(x), and the light quantity distribution of the image signal is substituted with g(x), the above formula (1) can be rewritten using a line spread function L(a) to the following formula:

$$g(x) = \int_{-\infty}^{\infty} f(x-a)L(a)da \quad (2)$$

Moreover, the relationship between a point spread function and a line spread function can be expressed as the following formula (3):

$$L(a) = \int_{-\infty}^{\infty} h(a, b)db \quad (3)$$

As described above, it is conceivable that an intensity distribution of a point image that is formed on the image forming plane by a given point light source passing through the exit pupil of the optical system, that is, a so-called point spread function is a reduced size projection of the shape of the exit pupil onto the image forming plane if the optical system is aplanatic. Therefore, the point spread function h(a, b) can be substituted with a pupil intensity distribution. Furthermore, from the formula (3), it is conceivable that a line spread function is a projection of a pupil intensity distribution. Therefore, with respect to FIGS. 5A to 5C and 6A to 6C, the projections of the pupil intensity distributions have been assumed as the line spread functions. Thus, from the formula (2), the asymmetrical line spread functions LSFA' and LSFB' described in FIGS. 6A to 6C are individually convolved in the object image of the present embodiment, and the pair of image signals are accordingly asymmetrical. In the case where a pair of image signals for use in a correlation operation is asymmetrical as described above, the accuracy of calculation of the focal position is also low. In order to improve the accuracy of calculation of the focal position, it is effective to correct the asymmetry between the pair of image signals to thereby increase the coincidence of the images.

Method for Correcting Asymmetry Between Image Signals

Next, a method for correcting the asymmetry between image signals during focus detection will be described. Here, an image signal obtained from the focus detection pixels 901a in FIG. 7 will be referred to as an image signal ImgA, and an image signal obtained from the focus detection pixels 901b will be referred to as an image signal ImgB. As described above, the asymmetry between the image signal ImgA and the image signal ImgB is caused by convolution of asymmetrical line spread functions LSFA" and LSFB".

Figure 9A:
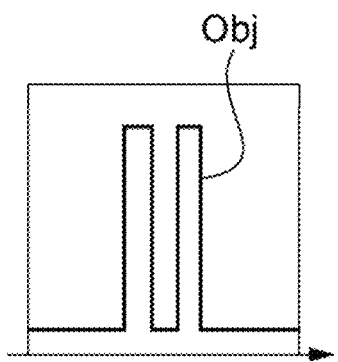
Figure 9B:
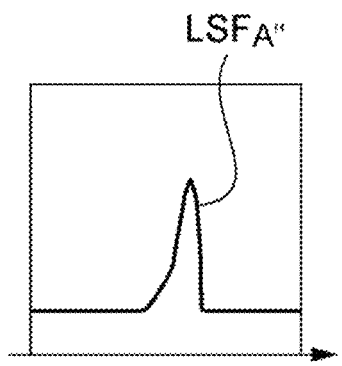
Figure 9C:
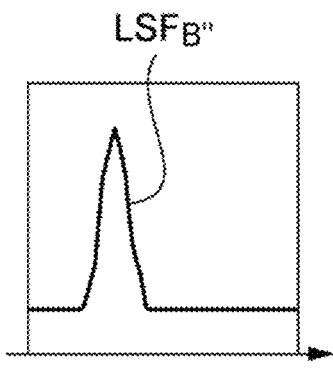
Figure 9D:
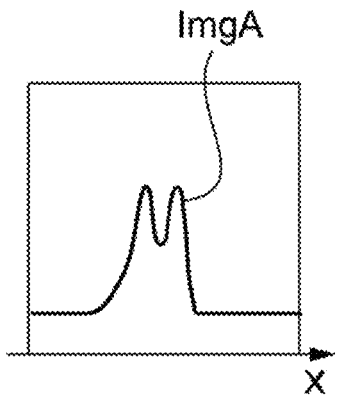

FIGS. 9A to 9I are conceptual diagrams for explaining image modification filtering for eliminating the asymmetry between image signals. In each of FIGS. 9A to 9I, the horizontal axis represent the direction in which pixels are aligned, and the vertical axis represents image signal intensity. FIG. 9A shows a light quantity distribution Obj of the object, and FIGS. 9B and 9C show the line spread functions LSFA" and LSFB" of the focus detection pixel SHA and the focus detection pixel SHB, respectively. FIGS. 9D and 9E show the image signal ImgA and the image signal ImgB, each of which has the shape as shown in the figure when the line spread function LSFA" or the line spread function LSFB" is convolved with the light quantity distribution Obj of the object. FIG. 9F shows an image modification filter FilA for the image signal ImgA. FIG. 9G shows an image modification filter FilB for the image signal ImgB. FIG. 9H shows a modified image signal ReImgA obtained by convolving the image modification filter FilA with the image signal ImgA. FIG. 9I shows a modified image signal ReImgB obtained by convolving the image modification filter FilB with the image signal ImgB. As shown in FIGS. 9H and 9I, the modified images have the same shape.

A principle by which the modified images have the same shape will be described. The image signal ImgA is obtained by the above-described formula (2). When the modified image ReImgA obtained by convolving the image modification filter FilA with the obtained image signal ImgA is expressed as k(x), k(x) can be obtained as follows:

$$k(x) = \int_{-\infty}^{\infty} g(x-b)L_B(b)db \quad (4)$$
$$= \int_{-\infty}^{\infty}\int_{-\infty}^{\infty} f(x-a-b)L_A(a)daL_B(b)db$$
$$= \int_{-\infty}^{\infty}\int_{-\infty}^{\infty} f(x-a-b)L_A(a)L_B(b)dadb$$

When the modified image ReImgB is calculated in the same manner, $$k(x) = \int_{-\infty}^{\infty}\int_{-\infty}^{\infty} f(x-a-b)L_A(a)L_B(b)dadb \quad (5)$$

is obtained. From the above formulae (4) and (5), the obtained ReImgA and ReImgB are equal to each other, and it is possible to calculate the defocus amount by performing a correlation operation using ReImgA and ReImgB.

Correction of Focus Detection Pixel

Next, a captured image is generated from the image signals of the focus detection pixels. Conventionally, image signals of focus detection pixels such as SHA and SHB in FIGS. 3A and 3B cannot be used as-is when generating an image. For this reason, in the present embodiment, correction of the focus detection pixels is performed by using the calculated defocus amount, and thus a favorable captured image is obtained.

Figure 10:
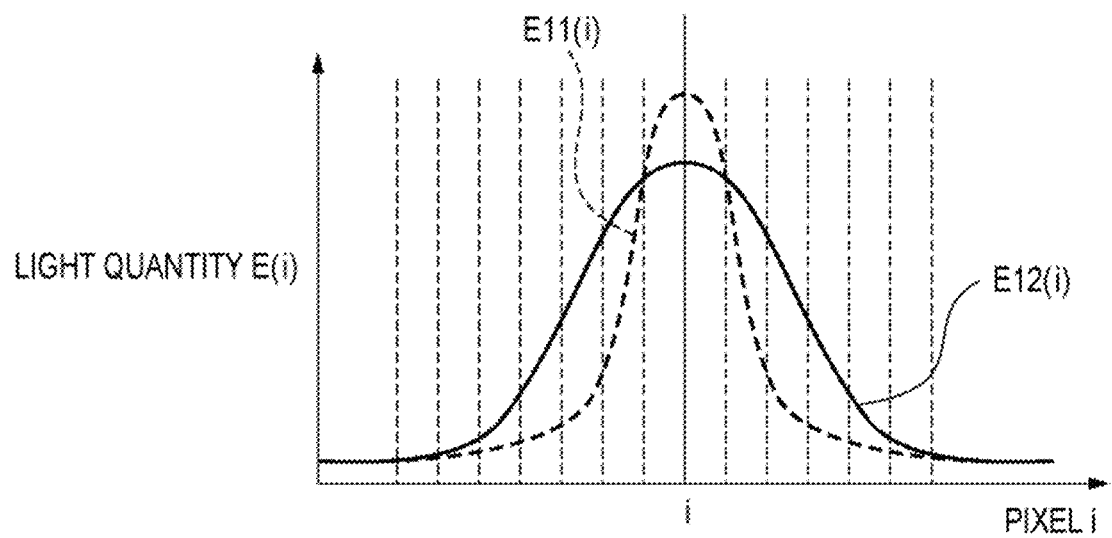
FIG. 10 is a diagram showing image signals that are obtained from image capturing pixels in a defocus state and in an in-focus state.

First, the difference in image signals of the image capturing pixels and the focus detection pixels between an in-focus state and a defocus state will be described. FIG. 10 is a diagram illustrating line images of R pixels or G pixels as shown in FIG. 2 in a central portion of a screen in an in-focus state and in a defocus state. E11(i) indicates a signal output in the in-focus state, and E12(i) indicates a line image in the defocus state. Assuming that an image signal like E11(i) is obtained in the in-focus state, image capturing pixel output like E12(i) is obtained in the defocus state. Here, accumulated light quantities of E11(i) and E12(i) are equal to each other, and therefore the following relationship holds:

$$\int_0^N E11(i)di = \int_0^N E12(i)di \qquad (6)$$

Figure 11:
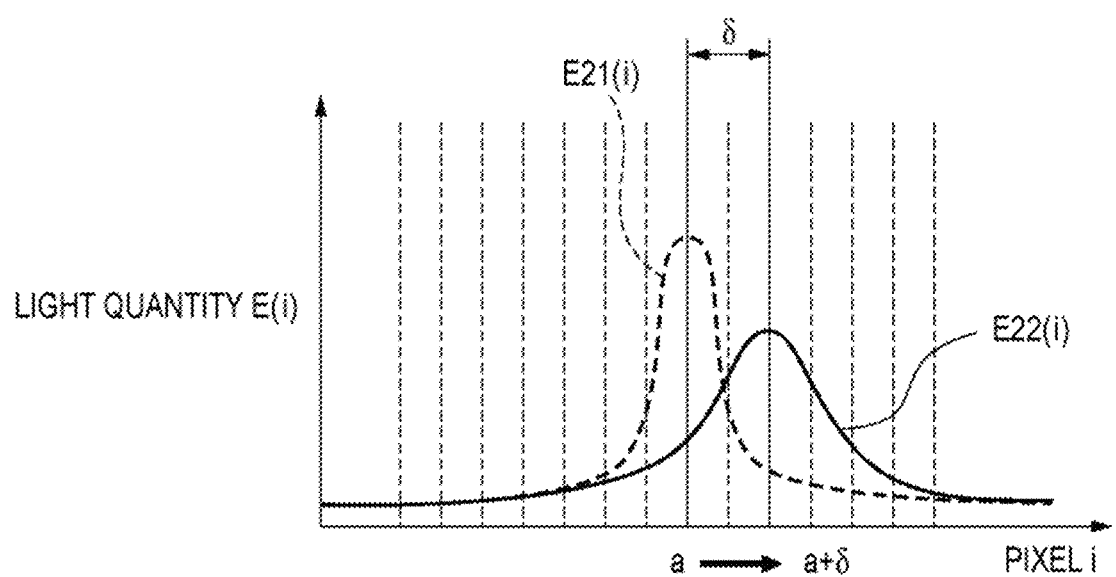
FIG. 11 is a diagram showing image signals that are obtained from focus detection pixels in a defocus state and in an in-focus state.

FIG. 11 is a diagram illustrating line images of pixels SHA or pixels SHB as shown in FIGS. 3A and 3B in the central portion of the screen in an in-focus state and in a defocus state. E21(i) indicates an image signal in the in-focus state, and E22(i) indicates a line image in the defocus state. Unlike the image capturing pixels, the openings of the focus detection pixels SHA or SHB are partially shielded, and therefore the image signal is smaller than the image signal E11(i) in FIG. 10. Assuming that a signal output like E21(i) is obtained in the in-focus state, an image signal like E22(i) is obtained in the defocus state. Moreover, as in FIG. 10, accumulated light quantities of E21(i) and E22(i) are equal to each other. However, unlike FIG. 10, in the defocus state, the image signal is not only blurred and spread out. Considering a single pixel, the opening of the focus detection pixel SHA or SHB in FIGS. 3A and 3B is shifted to the left or to the right from the optical axis. Accordingly, in the defocus state, the opening side gets blurred and spread out to a greater extent, and the obtained image signal is shifted by an amount δ in the direction of the pixels. As described above, the manner in which an image signal gets blurred differs between the image capturing pixels and the focus detection pixels due to the difference with respect to the openings. Thus, in the present embodiment, this shift amount δ, which depends on the defocus amount, is used to estimate an optimum pixel for correction. Then, correction is performed by multiplying the obtained image signals by a gain, thereby generating favorable images (a first corrected image signal and a second corrected image signal) that are equivalent to the signal of the image capturing pixels.

Figure 12:
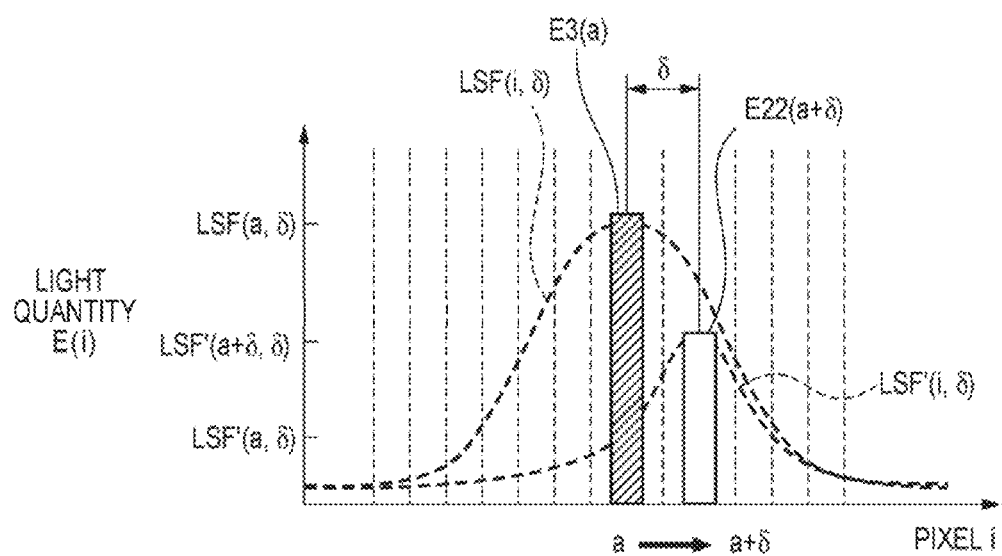
FIG. 12 is a conceptual diagram of correction of a focus detection pixel during image generation.

FIG. 12 is a diagram illustrating correction of the focus detection pixels. LSF(i, δ) indicates a line image of image capturing pixels in a defocus state in which the shift amount is δ, and LSF'(i, δ) indicates a line image of focus detection pixels in the defocus state in which the shift amount is δ. LSF'(a, δ) indicates the line image at an i=ath focus detection pixel, LSF'(a+δ, δ) indicates the line image at an i=(a+δ)th focus detection pixel, and LSF(a, δ) indicates the line image at an i=ath image capturing pixel. Moreover, E22(a+δ) indicates an image signal of the i=(a+δ)th focus detection pixel, and E3(a) indicates an image signal of the i=ath focus detection pixel after correction.

First, the shift amount δ caused by the focus detection pixels is calculated from a defocus amount that can be found by a known correlation operation. A gain G for use in correction is calculated based on this shift amount δ, and an image signal to be multiplied by the gain G is acquired. The gain G is first obtained. This gain G can be expressed using the pixel position i and the shift amount δ calculated from the defocus amount. When the gain G is expressed as a formula, the formula can be expressed like the following formula (7):

$$G(i, \delta) = \frac{LSF(i, \delta)}{LSF'(i+\delta, \delta)} \qquad (7)$$

Here, the line images LSF(i, δ) and LSF'(i, δ) are values calculated by simulation using the shift amount δ or otherwise values held as a data table in advance. Next, the image signal E22(a+δ) obtained from the shift amount δ is acquired. Then, the gain G(i, δ) and E22(a+δ) are multiplied, thereby calculating the signal E3(a) for generating an image.

$$E3(a) \approx G(a,\delta) \times E22(a+\delta) \qquad (8)$$

In the first embodiment of the present invention, correction of the focus detection pixels in the central portion of the screen at an image height x=0 has been described. The same idea can be applied to a peripheral portion of the screen as well.

Computation Flow of Image Generation Processing

Figure 13:
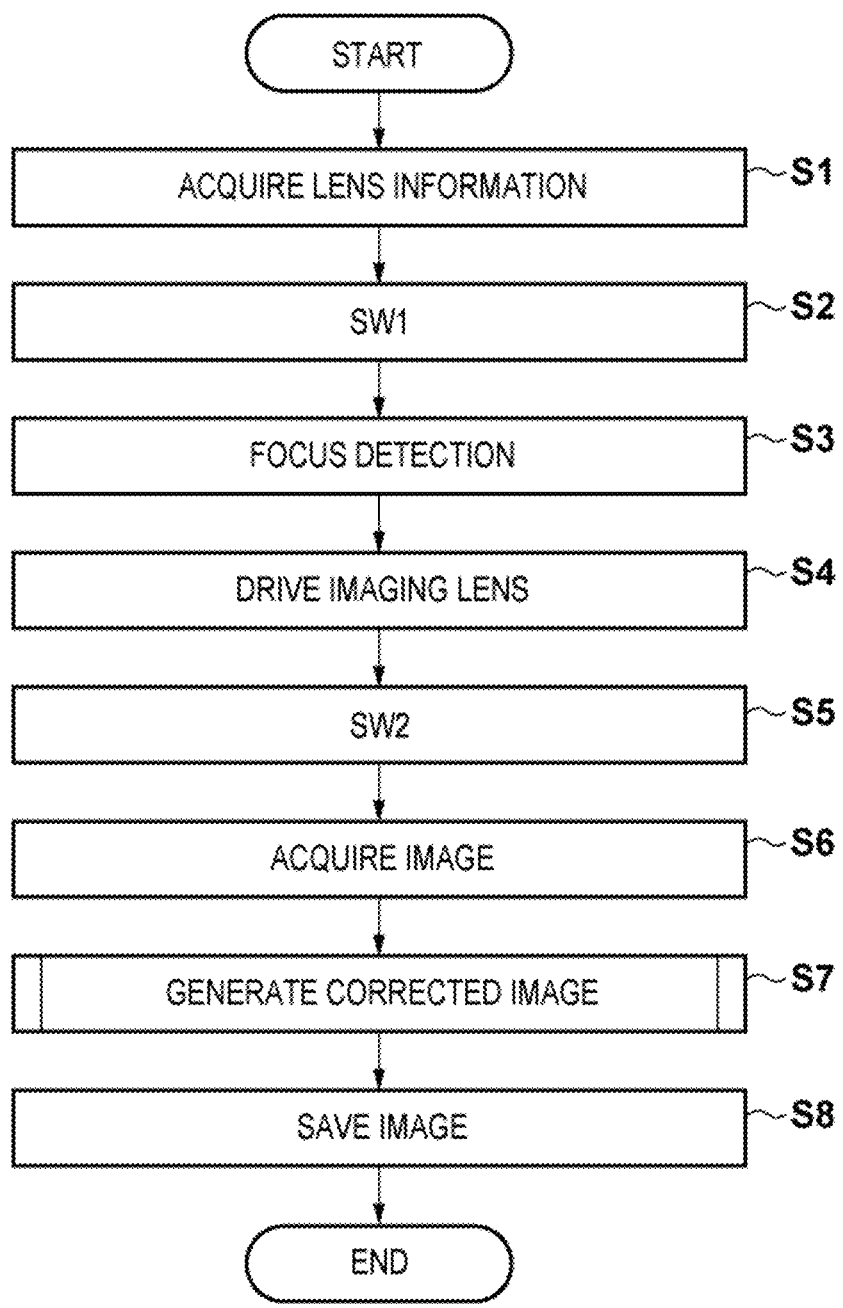
FIG. 13 is a flow diagram of a series of shooting operations.
Figure 14:
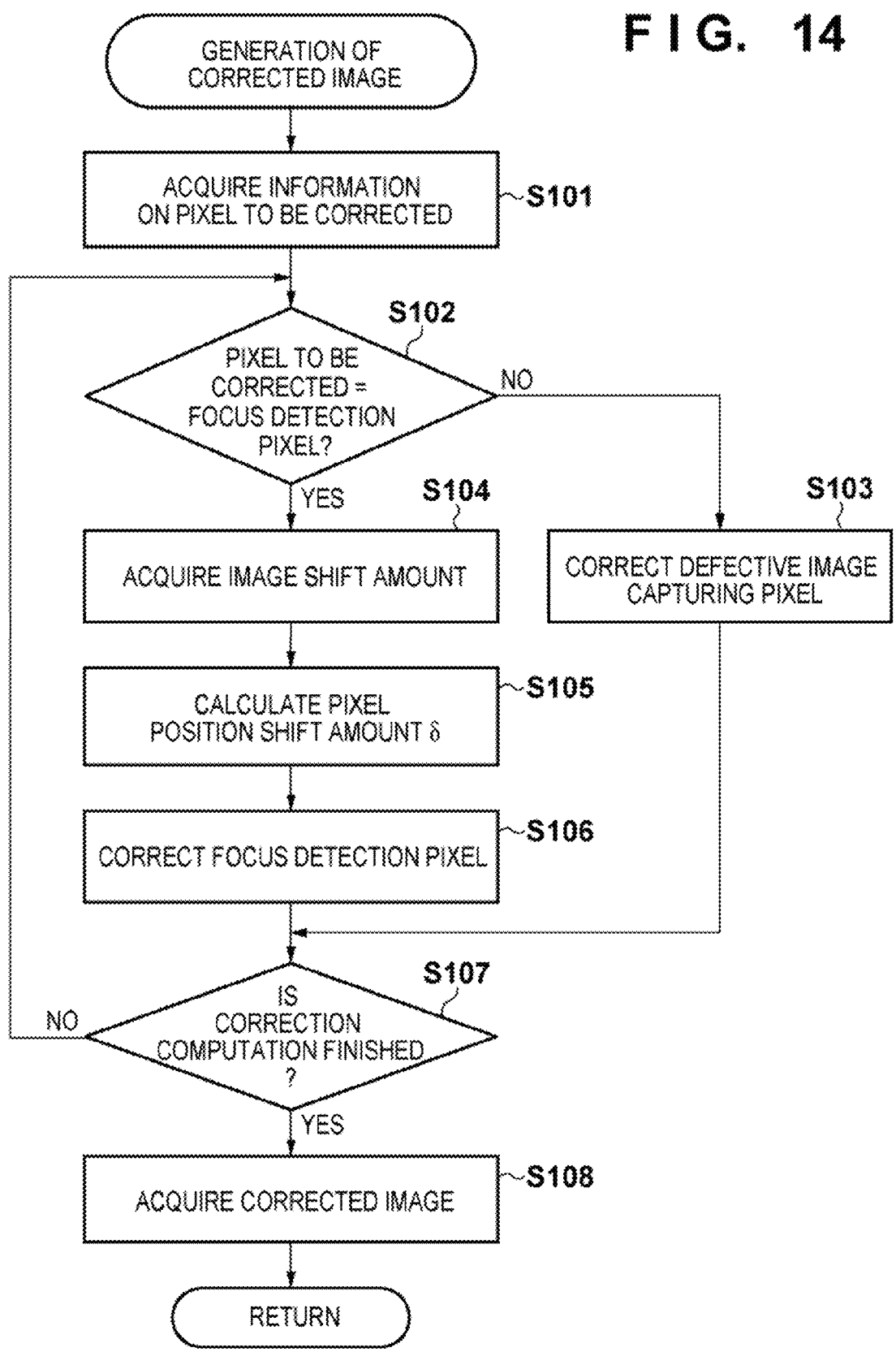
FIG. 14 is a flow diagram of correction in the case where a pixel that is specified using an aperture value, a defocus amount, and a pixel position is a focus detection pixel.

Next, the flow of image generation processing according to the first embodiment will be described using flow diagrams in FIGS. 13 and 14. It should be noted that operations in the flow illustrated in FIGS. 13 and 14 are executed by the CPU 121.

First, a shooting flow diagram in FIG. 13, which is a main routine, will be described. In step S1, lens information for finding the status of vignetting caused by the imaging lens is acquired. In step S2, it is detected that SW1 has been pressed. SW1 herein refers to a first stage of a shutter release button. As a result of SW1 being pressed, focus detection in step S3 is performed. In step S3, dark correction, shading correction, and correction that is required in focus detection in the case where focus detection pixels are arranged on an image capturing element as in the present embodiment are performed. In focus detection as described in the present embodiment, image signals for use in focus detection become asymmetrical. Thus, correction for reducing the asymmetry as described above is performed. After these various types of correction have been performed, focus detection is performed to calculate a defocus amount.

In step S4, based on the defocus amount calculated in step S3, the imaging lens is driven so that a main object is in focus. In step S5, it is detected that SW2 has been pressed. SW2 herein refers to a second stage of the shutter release button. In step S6, as a result of SW2 being pressed, the mirror flips up, and light beams are received by the image capturing element 107, and thus an image is acquired. In step S7, correction of a defective pixel and the focus detection pixels during image generation is performed, and an image is generated. In step S8, the image corrected in step S7 is acquired and saved in the flash memory 133. Thus, the shooting flow is terminated.

Next, a subroutine of generation of the corrected image in step S7 will be described using FIG. 14. In step S101, information on a pixel to be corrected is acquired from the image acquired in step S6 of the shooting flow in FIG. 13. This information on the pixel to be corrected contains the image height (x, y), the shift amount δ that depends on the defocus amount, and the pixel number i of the pixel to be corrected. In step S102, it is determined whether the pixel to be corrected that has been acquired in step S101 is a focus detection pixel. If the pixel to be corrected is the focus detection pixel, processing proceeds to step S104, and correction is performed using the defocus amount and the pixel position information.

If the pixel to be corrected is a defective image capturing pixel, processing proceeds to step S103, and correction is performed. Step S103 is processing in the case where it is determined in step S102 that the pixel to be corrected is the defective image capturing pixel. Correction of the defective image capturing pixels is performed using a known correction process. For example, interpolation is performed using neighboring pixels, or a gain correction process, an offset correction process, or the like is performed.

Step S104 is processing in the case where it is determined in step S102 that the pixel to be corrected is the focus detection pixel. From step S3 of the shooting flow in FIG. 13, the defocus amount that is required for image correction of the focus detection pixel is acquired. In step S105, a pixel position shift amount δ is calculated using the aperture value acquired in step S1 of the shooting flow in FIG. 13, the defocus amount acquired in step S104, and the information on the position of the pixel to be corrected acquired in step S101. In step S106, correction of the focus detection pixel during image generation is performed, and an image is generated. A pixel output for use in correction is acquired from the pixel position shift amount δ calculated in step S105. Then, with respect to the acquired pixel output, a gain correction process is performed using the gain G that is specified by the aperture value acquired in step S1 of the shooting flow in FIG. 13, the defocus amount acquired in step S104, the information on the pixel to be corrected acquired in step S101, and the lens information obtained in step S1 in FIG. 13.

In step S107, if the correction computation has been finished for all of the pixels to be corrected, processing proceeds to step S108, and an image is generated, whereas if the correction computation has not yet been finished, processing returns to step S102, and the series of operations of image correction processing is performed. In step S108, a corrected image is generated using the image signal after the correction processing up to step S107 has been performed and the image signal of the image capturing pixels. Thus, the series of operations of the flow for generating a corrected image is terminated, and processing returns to step S8 of the shooting flow in FIG. 13.

As described above, according to the first embodiment, it is possible to perform image correction using the defocus amount, the image height, the pixel number, the aperture value, and the like and thereby to acquire a favorable corrected image. It should be noted that although the image shift detection method was used for the correlation operation in the first embodiment, the same result can be obtained even when other methods are used.

Second Embodiment

A second embodiment is a variation of the first embodiment.

Processing According to Pixel Position Shift Amount δ

Figure 15:
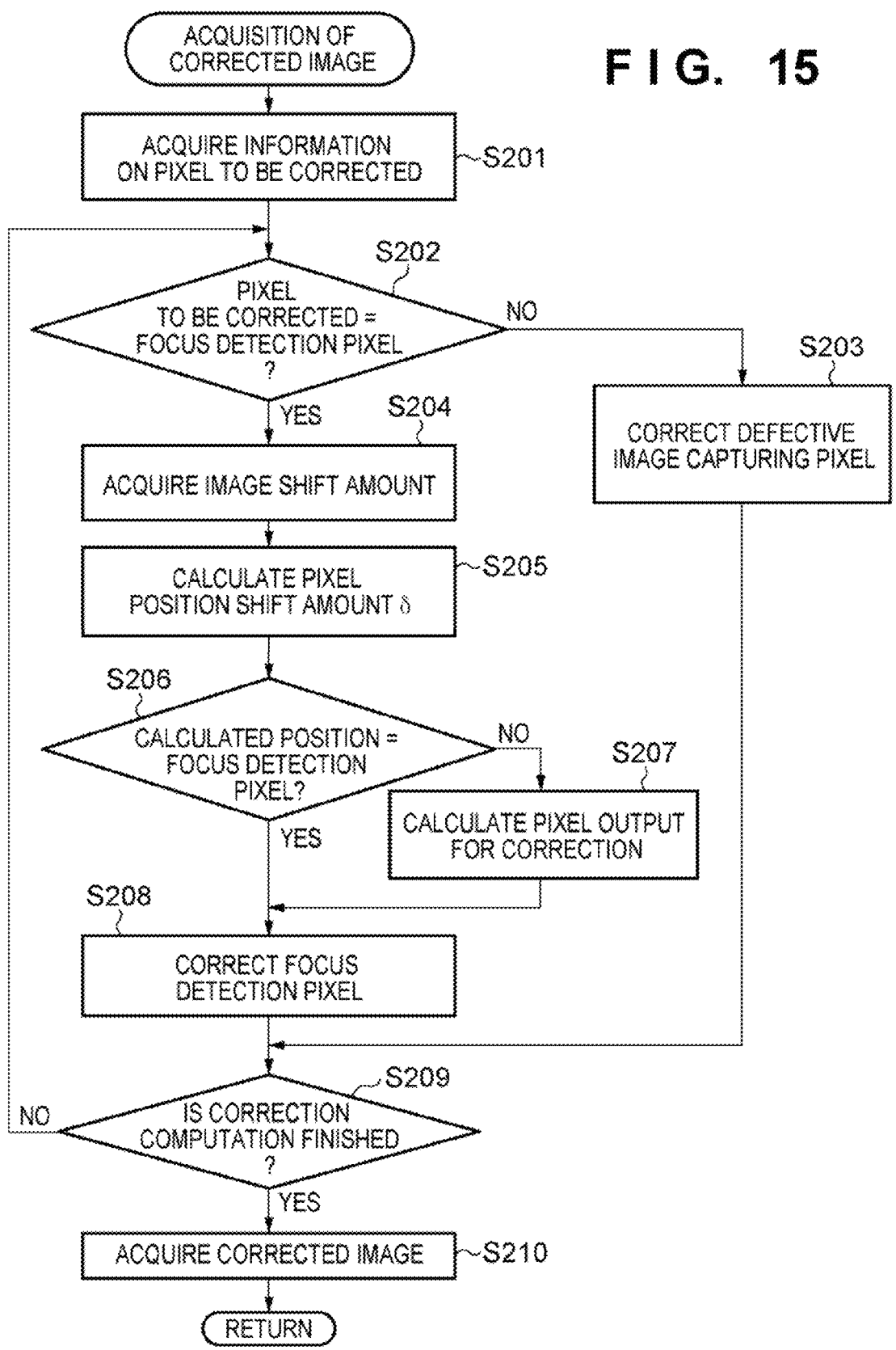
FIG. 15 is a flow diagram of correction in the case where a pixel that is specified using an aperture value, a defocus amount, and a pixel position is not a focus detection pixel.

In the first embodiment, the case where a pixel that is acquired using the pixel position shift amount δ calculated from the defocus amount, the image height, the pixel number, and the aperture value is a focus detection pixel was described. However, the acquired pixel is not necessarily always a focus detection pixel. For this reason, a feature of the second embodiment is that if the acquired pixel is not a focus detection pixel, the pixel output at the pixel position is obtained from neighboring focus detection pixels by interpolation to generate an image. Now, the second embodiment will be described using FIG. 15. It should be noted that operations of the flow in FIG. 15 are executed by the CPU 121. Since focus detection and shooting steps of an image capture apparatus according to the second embodiment are the same as those in the first embodiment, descriptions thereof will be omitted.

FIG. 15 is a diagram regarding the present embodiment, that is, the second embodiment. FIG. 15 shows the flow in which determination of whether or not the pixel acquired from the pixel position shift amount δ is a focus detection pixel is added to the flow in FIG. 14.

Since steps S201 to S205 are the same as those in FIG. 14, which was used in the description of the first embodiment, descriptions thereof will be omitted. In step S206, a pixel output at the position to be used for correction is acquired from the pixel position shift amount δ that has been calculated in step S205, and it is determined whether or not that pixel is a focus detection pixel. If the acquired pixel is the focus detection pixel, processing proceeds to step S208, and the same processing as in step S106 in FIG. 14 is performed. If the acquired pixel is not a focus detection pixel, processing proceeds to step S207, and the pixel output for correction is calculated. Step S207 is performed in the case where the pixel at the position calculated in step S206 is not a focus detection pixel. First, position information and output information on several focus detection pixels in the vicinity of the position of the pixel to be used for correction are acquired from the pixel position shift amount δ. Then, from the acquired information, a pixel output at the position of the pixel to be used for correction is obtained using a known interpolation process such as linear interpolation or bicubic interpolation.

In step S208, correction of the focus detection pixel during image generation is performed as in step S106 in FIG. 13. If it is determined from the pixel position shift amount δ in step S206 that the pixel at the position to be used for correction is the focus detection pixel, an output of this focus detection pixel is acquired. If it is determined in step S206 that the pixel is not a focus detection pixel, the pixel output calculated in step S207 is used. Then, with respect to the acquired pixel output, the gain correction process is performed using the gain G that is specified by the aperture value acquired in step S1 of the shooting flow in FIG. 13, the defocus amount acquired in step S104, the information on the pixel to be corrected acquired in step S101, and the lens information obtained in step S1 in FIG. 13.

In step S209, if the correction computation has been finished for all of the pixels to be corrected, processing proceeds to step S210, and an image is generated, whereas if the correction computation has not yet been finished, processing returns to step S202, and the series of operations of the image correction processing is performed. In step S210, a corrected image is generated using the image signal after the correction processing up to step S209 has been performed and the image signal of the image capturing pixels. Thus the series of operations of the flow for generating a corrected image is terminated, and processing returns to step S8 of the shooting flow in FIG. 13.

As described above, according to the second embodiment, it is possible to perform image correction using the defocus amount, the image height, the pixel number, the aperture value, and the like and thereby to acquire a favorable corrected image. It should be noted that although the image shift detection method was used for the correlation operation in the second embodiment, the same result can be obtained even when other methods are used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-001393, filed Jan. 6, 2011, which is hereby incorporated by reference herein in its entirety.

The invention claimed is:

1. An image capture apparatus comprising:
an image capture unit having a first pixel group that receives a light beam passing through a first area in an exit pupil of an imaging lens that forms an object image, a second pixel group that receives a light beam passing through a second area in the exit pupil of the imaging lens, the second area being different from the first area, and a third pixel group that receives a light beam passing through an entire area in the exit pupil of the imaging lens;
a focus detection unit configured to calculate a defocus amount of the imaging lens using a first image signal obtained from the first pixel group and a second image signal obtained from the second pixel group; and
an image generation unit configured to correct the first image signal and the second image signal obtained from the first pixel group and the second pixel group of the image capture unit so as to be equivalent to a third image signal obtained from the third pixel group, and to generate a captured image using a first corrected image signal, a second corrected image signal, and the third image signal,
wherein the image generation unit corrects the first image signal and the second image signal at least by multiplying the first image signal and the second image signal by a gain, the gain changing based on the defocus amount calculated by the focus detection unit using the first image signal and the second image signal, and obtains the first corrected image signal and the second corrected image signal.

2. The image capture apparatus according to claim 1, wherein the image generation unit performs correction with respect to the first image signal or the second image signal to be corrected, based on the defocus amount calculated by the focus detection unit and an output of the first image signal or second image signal, to obtain the first corrected image signal and the second corrected image signal.

3. The image capture apparatus according to claim 1, wherein if an image signal obtained from the defocus amount calculated by the focus detection unit for use in correction is neither the first image signal nor the second image signal, the image generation unit calculates the first corrected image signal and the second corrected image signal from the first image signal and the second image signal.

4. An image capture apparatus comprising:
an image sensor having a first pixel group that receives a light beam passing through a first area in an exit pupil of an imaging lens that forms an object image, a second pixel group that receives a light beam passing through a second area in the exit pupil of the imaging lens, the second area being different from the first area, and a third pixel group that receives a light beam passing through an entire area in the exit pupil of the imaging lens; and
at least one processor, wherein said at least one processor is operable to function as:
a focus detection unit configured to calculate a defocus amount of the imaging lens using a first image signal obtained from the first pixel group and a second image signal obtained from the second pixel group; and
an image generation unit configured to correct the first image signal and the second image signal obtained from the first pixel group and the second pixel group of the image sensor so as to be equivalent to a third image signal obtained from the third pixel group, and to generate a captured image using a first corrected image signal, a second corrected image signal, and the third image signal,
wherein the image generation unit corrects the first image signal and the second image signal at least by multiplying the first image signal and the second image signal by a gain, the gain changing based on the defocus amount calculated by the focus detection unit using the first image signal and the second image signal, and obtains the first corrected image signal and the second corrected image signal.

5. The image capture apparatus according to claim 4, wherein the image generation unit performs correction with respect to the first image signal or the second image signal to be corrected, based on the defocus amount calculated by the focus detection unit and an output of the first image signal or second image signal, to obtain the first corrected image signal and the second corrected image signal.

6. The image capture apparatus according to claim 4, wherein if an image signal obtained from the defocus amount calculated by the focus detection unit for use in correction is neither the first image signal nor the second image signal, the image generation unit calculates the first corrected image signal and the second corrected image signal from the first image signal and the second image signal.

7. A method of capturing an image using an image sensor and at least one processor, comprising the steps of:
receiving, with a first pixel group of the image sensor, a light beam passing through a first area in an exit pupil of an imaging lens to form an object image;
receiving, with a second pixel group of the image sensor, a light beam passing through a second area in the exit pupil of the imaging lens, the second area being different from the first area;
receiving, with a third pixel group of the image sensor, a light beam passing through an entire area in the exit pupil of the imaging lens;
calculating, using the at least one processor, a defocus amount of the imaging lens using a first image signal obtained from the first pixel group and a second image signal obtained from the second pixel group;
correcting, using the at least one processor, the first image signal and the second image signal obtained from the first pixel group and the second pixel group, at least by multiplying the first image signal and the second image signal by a gain, the gain changing based on the defocus amount calculated in the calculating step, so as to be equivalent to a third image signal obtained from the third pixel group; and
generating, using the at least one processor, a captured image using a first corrected image signal, a second corrected image signal, and the third image signal.

8. The method according to claim 7, wherein the correcting step corrects the first image signal or the second image signal, based on the defocus amount calculated in the calculating step and an output of the first image signal or second image signal, to obtain the first corrected image signal and the second corrected image signal.

9. The method according to claim 7, wherein if an image signal obtained from the defocus amount calculated in the calculating step for use in correction is neither the first image signal nor the second image signal, the correcting step calculates the first corrected image signal and the second corrected image signal from the first image signal and the second image signal.

10. An image capture apparatus comprising:
an image capture unit having a first pixel group that receives a light beam passing through a first area in an exit pupil of an imaging lens that forms an object image, a second pixel group that receives a light beam passing through a second area in the exit pupil of the imaging lens, the second area being different from the first area, and a third pixel group that receives a light beam passing through an entire area in the exit pupil of the imaging lens;
a focus detection unit configured to calculate a defocus amount of the imaging lens using a first image signal obtained from the first pixel group and a second image signal obtained from the second pixel group; and
an image generation unit configured to process the first image signal to generate a first processed image signal and process the second image signal to generate a second processed image signal, and to generate a captured image using the first processed image signal, the second processed image signal, and a third image signal obtained from the third pixel group,
wherein, in the processing by the image generation unit, the first image signal and the second image signal are multiplied by a gain, the gain changing based on the defocus amount.

11. The image capture apparatus according to claim 10, wherein the image generation unit performs correction with respect to the first image signal or the second image signal to be processed, based on the defocus amount calculated by the focus detection unit and an output of the first image signal or second image signal, to obtain the first processed image signal and the second processed image signal.

12. The image capture apparatus according to claim 10, wherein if an image signal obtained from the defocus amount calculated by the focus detection unit for use in correction is neither the first image signal nor the second image signal, the image generation unit calculates the first processed image signal and the second processed image signal from the first image signal and the second image signal.

13. An image capture apparatus comprising:
an image sensor having a first pixel group that receives a light beam passing through a first area in an exit pupil of an imaging lens that forms an object image, a second pixel group that receives a light beam passing through a second area in the exit pupil of the imaging lens, the second area being different from the first area, and a third pixel group that receives a light beam passing through an entire area in the exit pupil of the imaging lens; and
at least one processor, wherein said at least one processor is operable to function as:
a focus detection unit configured to calculate a defocus amount of the imaging lens using a first image signal obtained from the first pixel group and a second image signal obtained from the second pixel group; and
an image generation unit configured to process the first image signal to generate a first processed image signal and process the second image signal to generate a second processed image signal, and to generate a captured image using the first processed image signal, the second processed image signal, and a third image signal obtained from the third pixel group,
wherein, in the processing by the image generation unit, the first image signal and the second image signal are multiplied by a gain, the gain changing based on the defocus amount.

14. The image capture apparatus according to claim 13, wherein the image generation unit performs correction with respect to the first image signal or the second image signal to be processed, based on the defocus amount calculated by the focus detection unit and an output of the first image signal or second image signal, to obtain the first processed image signal and the second processed image signal.

15. The image capture apparatus according to claim 13, wherein if an image signal obtained from the defocus amount calculated by the focus detection unit for use in correction is neither the first image signal nor the second image signal, the image generation unit calculates the first processed image signal and the second processed image signal from the first image signal and the second image signal.

16. A method of capturing an image using an image sensor and at least one processor, comprising the steps of:
receiving, with a first pixel group of the image sensor, a light beam passing through a first area in an exit pupil of an imaging lens to form an object image;
receiving, with a second pixel group of the image sensor, a light beam passing through a second area in the exit pupil of the imaging lens, the second area being different from the first area;
receiving, with a third pixel group of the image sensor, a light beam passing through an entire area in the exit pupil of the imaging lens;
calculating, using the at least one processor, a defocus amount of the imaging lens using a first image signal obtained from the first pixel group and a second image signal obtained from the second pixel group;
correcting, using the at least one processor, the first image signal and the second image signal obtained from the first pixel group and the second pixel group, at least by multiplying the first image signal and the second image signal by a gain, the gain changing based on the defocus amount calculated in the calculating step, so as to be equivalent to a third image signal obtained from the third pixel group; and
generating, using the at least one processor, a captured image using a first processed image signal, a second processed image signal, and the third image signal.

17. The method according to claim 16, wherein the correcting step corrects the first image signal or the second image signal, based on the defocus amount calculated in the calculating step and an output of the first image signal or second image signal, to obtain the first processed image signal and the second processed image signal.

18. The method according to claim 16, wherein if an image signal obtained from the defocus amount calculated in the calculating step for use in correction is neither the first image signal nor the second image signal, the correcting step calculates the first processed image signal and the second processed image signal from the first image signal and the second image signal.

* * * * *